F. OPPENHEIM.

Vehicle Seat.

No. 9,464. Reissued Nov. 16, 1880.

WITNESSES.

H. F. Parker

John C. Turnbridge.

INVENTOR.

F. Oppenheim by his attorney

Geo. Briesen

N. PETERS, PHOTO-LITHOGRAPHER, WASHINGTON, D. C.

UNITED STATES PATENT OFFICE

FREDERICK OPPENHEIM, OF SAN FRANCISCO, CALIFORNIA.

VEHICLE-SEAT.

SPECIFICATION forming part of Reissued Letters Patent No. 9,464, dated November 16, 1880.

Original No. 174,148, dated February 29, 1876; Reissue No. 7,416, dated December 5, 1876. Application for reissue filed August 30, 1880.

*To all whom it may concern:*

Be it known that I, FREDERICK OPPENHEIM, of San Francisco, in the county of San Francisco and State of California, have invented a new and Improved Vehicle-Seat, of which the following is a specification.

This invention relates to a new arrangement of two vehicle-seats with reference to each other and to the vehicle-body, its object being to allow one seat to be folded over the other when the vehicle is to be used with but one seat, and to allow both seats to be duly separated when their separate use in the vehicle is required.

The invention consists in the several features and details of invention hereinafter more clearly pointed out.

Figure 1:
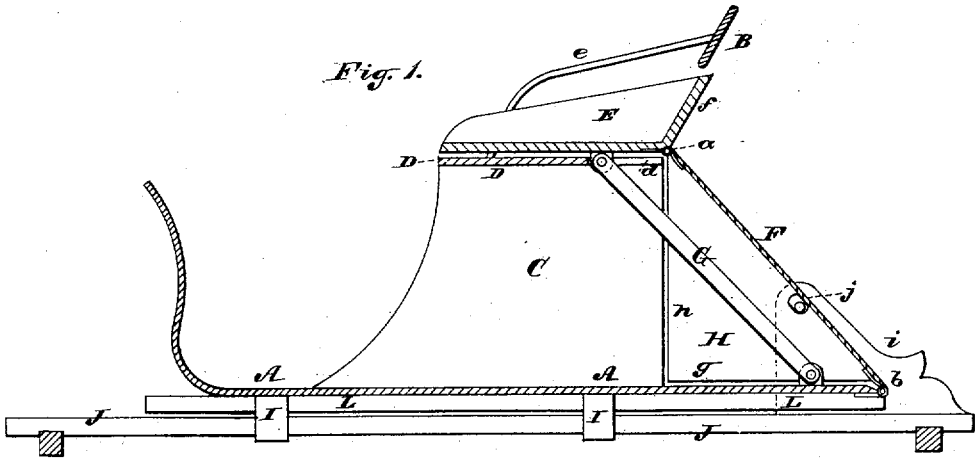
Figure 2:
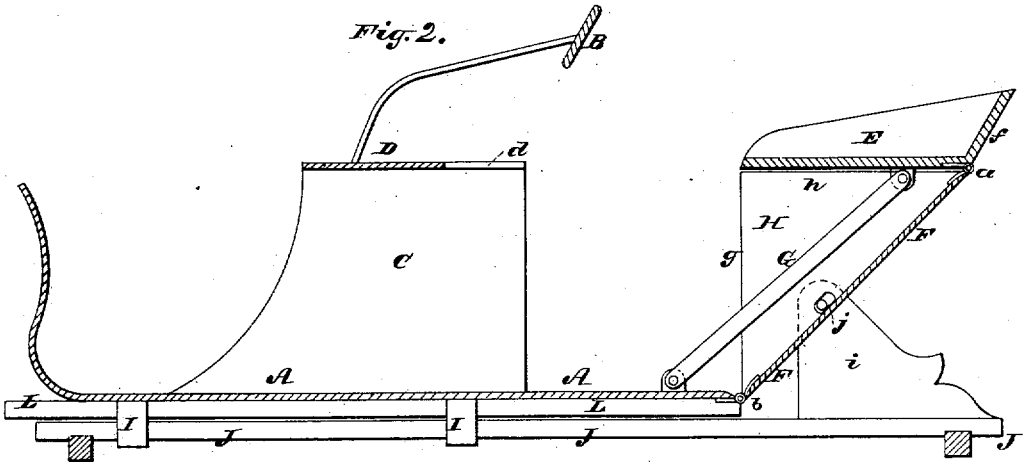
Figure 3:
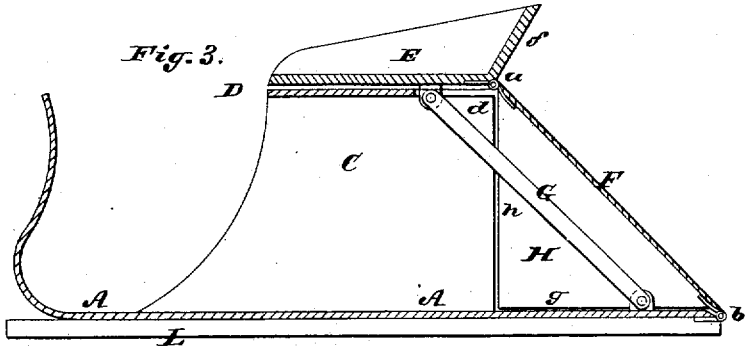

In the drawings, Figures 1 and 2 are vertical longitudinal sections of a vehicle having my improved seat, Fig. 1 showing the seats folded together, while in Fig. 2 they are shown separated. Fig. 3 is a vertical longitudinal section of the vehicle having a modification of the invention.

Similar letters of reference indicate corresponding parts in all the figures.

In the drawings, the letter A represents the body of a vehicle. From this body project rigidly the standards or supports C of one seat, D. The other seat, E, is at *a* hinged to the upper part of a frame or panel, F, whose lower part is at *b* hinged to the vehicle-body A, all as clearly shown in Figs. 1, 2, and 3. A brace, G, further connects the under side of the seat E with the body A, as shown, and serves to steady the seat E. There should be one such brace at each side of the vehicle under the seat E. When the seat E is folded over the seat D, as in Fig. 3, the vehicle has, in substance, but one seat; but when the seat E is swung away from the seat D, as in Fig. 2, the vehicle has two seats in position for use. In order to bring the seat E properly over the seat D in the folded position, that edge of the seat D toward which the seat E is folded has slots *d*, into which the upper parts of the braces G and their connections enter, as shown. When, as in the drawings, the seat D is the front seat of the vehicle, I supply it with a back, B, which is, by side rails, *e*, connected to the seat, but is raised off the seat sufficiently far to allow the seat E to fold under it, as in Fig. 1. The seat E has also a back, *f*, of such height that it will reach to the back B, as indicated in Fig. 1. This arrangement will make substantially a single back for the folded seat, and yet leaves each seat with a back when the seats are separated, as in Fig. 2. As a support for the seat E, and also in order to supply a side panel to the single and to the double seated vehicle, I attach rigidly to each end of the frame or panel F a frame or panel, H, of which one side, *g*, bears on the bottom of the body A when the seat E is folded over the seat D, the other side, *h*, being vertical, while when the seat E is thrown off the seat D the side *h* of the panel H is horizontal and directly beneath the seat E, the other side, *g*, being vertical, as in Fig. 2. These side pieces, H, will, when the seat E is folded upon the seat D, approach the standards C, forming, together with the same, nearly continuous sides for the body of the vehicle, and they also serve as a support for the seat E when the same is in the position indicated in Fig. 2.

Figs. 1 and 2 of the drawings show the vehicle-body A, to be joined by bands I I to a longitudinal bar, J, of the vehicle running-gear in such manner that the body A can slide on said bar J. A rail or sill, L, is in this case interposed between the body A and the bar J, but rigidly attached to the vehicle-body. In this case vertical ears *i i* project from the bar J near the lower hinged end of each side panel, H, and carry laterally-projecting pins *j*, that extend through slots in the panels H, as shown. In consequence, as the seat E is shifted it causes, by its connection with the ears *i* and bar J, a relative displacement of the carriage-body to its running-gear, or vice versa. By this means the weight is always properly distributed above the running-gear, for when the seats are folded, as in Fig. 1, they are nearly midway between the ends of the bar J, while when they are separated, as in Fig. 2, the seat E is above one end, and the seat D nearly above the other end, of the said bar J.

It will be seen that by the arrangement of the side panels, H, an open and convenient space is left between the separated seats D and E to admit persons between them, and yet when the seats are folded together these panels leave no projection beyond the panel F. By its connection with the hinged panel F and brace G the seat E maintains a substantially horizontal position as it is being shifted.

I claim as my invention—

1. In combination with a vehicle-body and its fixed seat D, the folding seat E, brace G, and frame F, all arranged to allow the seat E to be folded directly upon the seat D without displacing said seat D, substantially as specified.

2. The seat D, provided with slots in its edge for allowing the passage of the braces G, which connect with the shifting seat E, substantially as specified.

3. The fixed seat D, made with the raised back B, in combination with the shifting seat E, which is arranged to fold over the seat D, but under the back B, substantially as specified.

4. In combination with the shifting seat E, which is hinged to the panel F, the side panels, H H, rigidly attached to the panel F, to operate substantially as herein shown and described.

5. The combination, with the seat D, of the side panels, H, pivoted braces G, transverse support F, hinged to the vehicle-bottom, and seat E, hinged to the support, all substantially as herein shown and described.

6. The combination of the longitudinal supporting-bar J, ears *i i*, and pins *j j*, the sliding carriage-body A, hinged and slotted side panels, H, and hinged seat E, all arranged so that in shifting the seat the body A will slide on the bar J, substantially as specified.

7. In a vehicle, the combination of the fixed immovable board D with the movable seat E, all arranged so that said seat E can be placed upon and supported by said immovable board D, or moved away from the same and used as a seat in both positions, substantially as herein shown and described.

8. In a vehicle, the uprights C, carrying the fixed immovable board D, in combination with the movable seat E, which can be moved upon and supported by said immovable board, and moved away from the same and used as a seat in both positions, substantially as herein shown and described.

This specification of my invention signed by me this 18th day of August, 1880.

FREDK. OPPENHEIM.

Witnesses:
WM. H. C. SMITH,
SAML. R. BETTS.